UNITED STATES PATENT OFFICE.

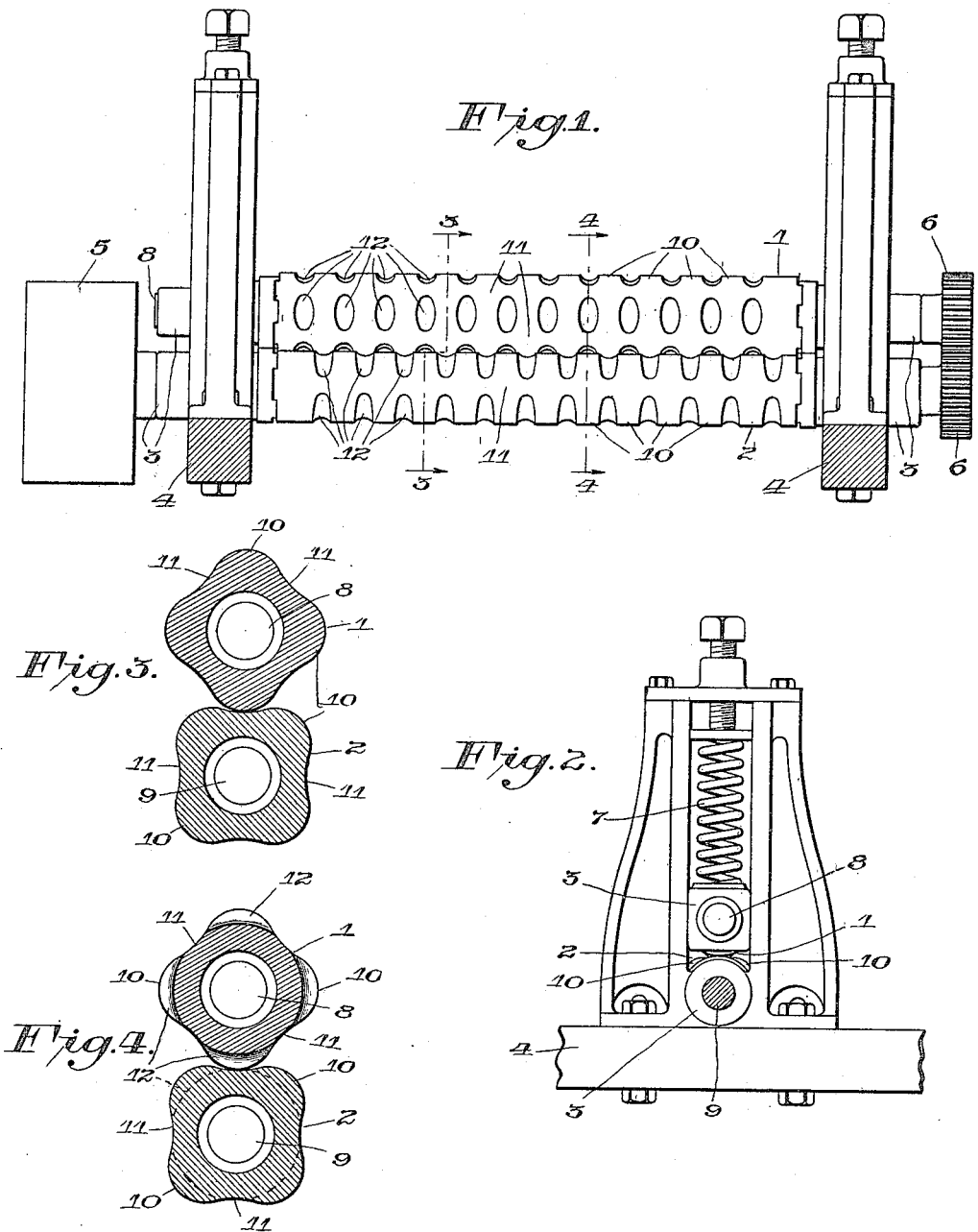

BARNEY GRONKE, OF CHICAGO, ILLINOIS, ASSIGNOR TO INTERNATIONAL HARVESTER COMPANY OF NEW JERSEY, A CORPORATION OF NEW JERSEY.

SNAPPING-ROLLS FOR CORN HUSKERS, PICKERS, AND THE LIKE.

1,225,806.  Specification of Letters Patent.  Patented May 15, 1917.

Application filed May 8, 1913. Serial No. 766,296.

*To all whom it may concern:*

Be it known that I, BARNEY GRONKE, a citizen of the United States, residing at Chicago, in the county of Cook and State of Illinois, have invented certain new and useful Improvements in Snapping-Rolls for Corn Huskers, Pickers, and the like, of which the following is a full, clear, and exact specification.

My invention relates to snapping rolls for corn huskers, pickers and the like.

It has for its object to remove the ears from the stalks in an improved manner. A further object of my invention is to separate the ears from the stalk in such a manner as to maintain the ear intact without mutilating or breaking off the end of the same. I attain these objects by providing improved snapping rolls adapted to coöperate with each other in such a manner that, when the stalk carrying the ear is moving between the same, the ears cannot be drawn in between the rolls, and are separated from the stalk by the rolling or knuckle action of the rolls against the butts of the same.

In order that my invention may be clearly and fully disclosed, I have illustrated one embodiment of the same in the accompanying drawings, wherein the same is shown adapted to use in a corn husker. It is to be understood, however, that the embodiment of my invention shown herein is susceptible of modification and that the rolls may be used in other connections than that shown.

Figure 1 is a front elevation of a pair of snapping rolls operatively connected to each other and mounted in their bearings;

Fig. 2 is an end elevation of the same, partially in section;

Fig. 3 is a sectional view on line 3—3 of Fig. 1;

Fig. 4 is a sectional view on line 4—4 of Fig. 1.

The construction shown herein, when broadly considered, comprises a plurality of coöperating oppositely rotating rolls 1 and 2 of an improved construction hereinafter described, mounted adjacent each other in parallel relation, in bearings 3 carried upon supports 4, the lower roll 2 being driven from a pulley 5 and transmitting its power to the other through gears 6 upon the opposite ends of the rolls, and the upper roll 1 being resiliently mounted and provided with adjustable springs 7 normally holding the same in a predetermined relation to the under roll 2.

As shown in Fig. 1, the rolls 1 and 2 are of identical construction and are fixed to the ends of stub shafts 8 and 9 in parallel relation so that they rotate in contact with each other. Each roll is preferably formed of cast metal and is substantially rectangular in cross section, being fluted, as shown in Fig. 3, and provided with a plurality of longitudinally extending rounded ridges 10 and shallow longitudinally extending grooves 11 in its sides intermediate these ridges. Each of these grooves is of such a depth that when the rolls are mounted as shown in Fig. 3, one of the ridges 10 of each roll will, when passing over a groove 11 in the other roll, occupy the position shown in that figure. As shown in Figs. 1 and 4, each of these rounded longitudinally extending ridges 10 is provided with a plurality of spaced transversely extending recesses 12 having curved transversely convexed bottoms which are arranged concentrically about the axis of each roll in a plurality of parallel series and are preferably of slightly less depth than the longitudinally extending fluted or grooved portions 11. It is to be noted that, as shown in Fig. 1, the two rolls are so disposed with respect to each other that the grooves 12 in the under roll come between the grooves 12 in the upper roll in such a manner that it is impossible to insert an object between the same without having this object diverted into one or the other series of grooves.

In the operation of the construction shown the rolls 1 and 2 are rotated from the pulley 5 and gears 6 in opposite directions. As the stalks carrying the ears are fed between the same, due to the arrangement of the groove portions 12, the stalks and ears are diverted into certain of these grooves. When, during the forward progress of the stalk, an ear reaches the rolls, the opposite sides of its butt are simultaneously acted upon by one of the rounded ridges 10 on one roll and the adjacent fluted portion 11 of the other roll in such a manner as to prevent the entry of the ear between the rolls. At the same time, as the stalk is being fed in one direction, the curved surfaces of the rolls unite in exerting an outward rolling or knuckle-like pressure upon the butt or comparatively flat end of the ear, causing the same to be pulled apart from the stalk without crushing or breaking the end of the ear or removing any of the kernels therefrom.

It is to be noted that in my improved construction the coöperating longitudinally extending rounded ridges and fluted portions of the rolls exert a rolling knuckle-like or pushing action upon the butt ends of the ears at the same time that the stalks are drawn inward. The major part of this action is exerted in a line parallel with the longitudinal axis of the ear. The result of this action is to maintain the comparatively flat ends or butts of the ears in a predetermined relation to the rolls as the stalk is fed forward and thus cause the ears to be pulled apart from the stalks without injury to the ears, and at the same time enable the surfaces of the rolls to grip and effectually remove the shank and some of the outer husks from the ears in such a manner that the subsequent husking of the ear is greatly facilitated.

While I have described one embodiment of my invention in this application, it is, of course, to be understood that the form shown herein for purposes of illustration may be modified without departing from the spirit of my invention.

What I claim as my invention, and desire to secure by Letters Patent, is:

1. A snapping roll having a plurality of longitudinally extending grooves therein, longitudinally extending rounded or rolling ribs intermediate said grooves and a transversely extending groove in each of said rounded ribs.

2. A snapping roll of substantially rectangular cross section, longitudinally fluted, and provided with longitudinally extending rounded ribs intermediate the fluted portions thereof and a plurality of transversely extending grooves intermediate the ends of each of said rounded ribs.

3. A snapping roll of substantially rectangular cross section longitudinally fluted and provided with longitudinally extending rounded corners intermediate the fluted portions thereof, and a plurality of transversely extending grooves intermediate the ends of each of said rounded ribs having convex bottoms lying in the circumference of a circle whose center coincides with the axis of the roll.

4. A plurality of coöperating snapping rolls, each having a plurality of longitudinally extending grooves therein, longitudinally extending rounded ribs intermediate said grooves, and a plurality of transversely extending grooves in each of said ribs communicating with the longitudinal grooves, the transverse grooves in one roll being arranged in staggered relation with respect to the corresponding grooves in the other roll, and the longitudinally extending ribs on one roll being received in the longitudinally extending grooves in the other.

5. A snapping roll having a plurality of grooves therein, rounded or rolling ribs intermediate said grooves, and a groove in each of said ribs.

6. A snapping roll having a plurality of grooves therein, rounded or rolling ribs intermediate said grooves, and grooves in said ribs, the bottoms of which grooves are farther from the axis of the roll than the bottoms of the first mentioned grooves.

In testimony whereof I affix my signature, in the presence of two witnesses.

BARNEY GRONKE.

Witnesses:
J. W. LUNDQUIST,
H. STUDEMEYER.

Copies of this patent may be obtained for five cents each, by addressing the "Commissioner of Patents, Washington, D. C."